United States Patent
Arnspiger (10) Patent No.: US 11,230,168 B1
(45) Date of Patent: Jan. 25, 2022

(54) PORTABLE WINDSHIELD ALIGNMENT AND INSTALLATION DEVICE FOR CARS AND MOTOR HOMES (71) Applicant: Roy Allan Arnspiger, Eagle Point, OR (US)

(72) Inventor: Roy Allan Arnspiger, Eagle Point, OR (US)

(*) Notice: Subject to any disclaimer, the term of this patent is extended or adjusted under 35 U.S.C. 154(b) by 186 days.

(21) Appl. No.: 16/505,109

(22) Filed: Jul. 8, 2019

Related U.S. Application Data (60) Provisional application No. 62/695,958, filed on Jul. 10, 2018.

(51) Int. Cl.
  *B60J 1/00* (2006.01)
  *B62D 65/06* (2006.01)
(52) U.S. Cl.
  CPC .............. *B60J 1/005* (2013.01); *B60J 1/006* (2013.01); *B62D 65/06* (2013.01)
(58) Field of Classification Search
  CPC ............ B60J 1/005; B60J 1/006; B62D 65/06
  See application file for complete search history.

(56) References Cited

U.S. PATENT DOCUMENTS

| | | |
|---|---|---|
| 3,620,524 A | 11/1971 | Czompi |
| 4,561,689 A | 12/1985 | Sprenger |
| 4,659,138 A | 4/1987 | Gosse et al. |
| 4,779,919 A | 10/1988 | Muller |
| 4,912,895 A | 4/1990 | Harris, Jr. |
| 4,921,297 A | 5/1990 | Stevens |
| 5,013,077 A | 5/1991 | Stevens |
| 5,152,576 A | 10/1992 | Ris |
| 5,190,604 A | 5/1993 | Shaver |
| 5,479,689 A | 1/1996 | Schmit et al. |
| 5,531,496 A | 7/1996 | Zbinden et al. |
| 5,956,833 A | 9/1999 | Davis et al. |
| 6,151,847 A | 11/2000 | Okuniewicz et al. |
| 6,209,946 B1 | 4/2001 | Eng |
| 8,677,626 B2 | 3/2014 | Adas et al. |
| 9,878,598 B2 | 1/2018 | Boehmer et al. |
| 2005/0121936 A1 | 6/2005 | Kennett |
| 2007/0266674 A1* | 11/2007 | Morey .................. E04D 13/031 52/783.11 |

* cited by examiner

*Primary Examiner* — Rick K Chang
(74) *Attorney, Agent, or Firm* — Jerry Haynes Law (57) ABSTRACT

A portable windshield alignment and installation device and method of setting windshields mounts to a windshield wiper post to mark the position of a removed windshield, so that a replacement windshield can be set in the exact same position. The tool comprises a bracket having a base plate, a slide plate, and a face plate. The base plate mounts to a slave post, and the slide plate abuts a replacement windshield. The plates form longitudinal slots. A wiper post panel has an aperture. The aperture enables passage of the windshield wiper post for mounting. A face plate having a stud overlays the slide plate to support the replacement windshield to replace the windshield, and also protect the replacement windshield. The studs align with, and slides through the slots to enable horizontal and vertical adjustments relative to wiper post and replacement windshield.

14 Claims, 12 Drawing Sheets

PORTABLE WINDSHIELD ALIGNMENT AND INSTALLATION DEVICE FOR CARS AND MOTOR HOMES

CROSS-REFERENCE TO RELATED APPLICATIONS

This application claims the benefit of U.S. provisional application No. 62/695,958, filed Jul. 10, 2018 and entitled WINDSHIELD INSTALLATION TOOL AND METHOD OF SETTING WINDSHIELDS, which provisional application is incorporated by reference herein in its entirety.

FIELD OF THE INVENTION

The present invention relates generally to a portable windshield alignment and installation device for cars and motor homes and method of setting windshields. More so, the present invention relates to a windshield installation device configured to mount to a windshield wiper post and mark the position of a removed windshield from a car and motor home, so that a replacement windshield can be set in the exact same position; whereby the device provides a bracket having a base plate and a slide plate; with the base plate mounted to a slave post, and the slide plate abutting against a face plate that mounts to a slave post on the windshield; and whereby the base and slide plates adjust horizontally and vertically to accurately mark the position of the removed windshield, such that the new windshield can be set in the exact same position; and further an alternative version of the windshield alignment and installation device is adaptable for motor homes.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a windshield of a vehicle provides an occupant visibility therethrough, while also protecting the occupant from wind, blown objects, insects, and other external elements. The windshield is often slightly parabolic in shape, and constructed from laminated safety glass having a curved sheet of glass with a plastic layer laminated between them for safety, and bonded into the window frame. Often, the vehicle frames has fitted to it, a windshield that aerodynamically forms on a given front of corresponding vehicles. Sometimes, the external elements break or crack the windshield; requiring a replacement windshield to be installed in its place.

In some instances, the windshield breaks or cracks, as external elements impact the surface thereof. One type of common break is a bulls-eye break defined by an outer layer of safety glass that incurs a break in the shape of an inverted cone. Other windshield break shapes may also occur, including a partial crack and a completely smashed windshield, such as when high-speed impacts occur.

Often, replacing the windshield that is damaged or broken requires mounting a replacement windshield to an associated vehicle frame through a mounting frame. Such a mounting frame does not only allow for a quick and easy exchange of a damaged or broken windshield, but also enables a required compatibility between the associated vehicle frame and specific material properties of the windshield. Aligning the replacement windshield in the exact location as the broken windshield can be problematic however.

Typically, a standard motor home is a self-propelled recreational vehicle, often used for vacations. Motor homes are known to be high off the ground, and thereby susceptible to having their windshield struck by external objects, such as tree limbs, or natural weather phenomena's. Consequently, it is often necessary to change/replace the windshield of the motor home. Unlike the windshield installation device discussed above, the motor home has a wider and longer windshield. Also, the motor home has a longer windshield wiper post, which can make standard windshield installation tools inoperable with such a large windshield.

Other proposals have involved windshield replacement kits and methods. Even though the above cited windshield replacement kits and methods meets some of the needs of the market, a portable windshield alignment and installation device and method of setting windshields that mounts to a windshield wiper post to mark the position of a removed windshield, so that a replacement windshield can be set in the exact same position; that provides a bracket having a base plate, a slide plate, and a face plate; with base plate mounting to a slave post, and the slide plate abutting against the face plate on a windshield; and whereby the plates adjust horizontally and vertically to accurately mark the position of the removed windshield, such that the new windshield can be set in the exact same position, is still desired.

SUMMARY

Illustrative embodiments of the disclosure are generally directed to a portable windshield alignment and installation device and method of installing windshields. The device serves to align a replacement windshield with a fixed component of a windshield frame, so as to achieve alignment. The device is configured to easily mount to a windshield wiper post, and thereby mark the position of a removed windshield, so that a replacement windshield can be set in the exact same position inside the frame of the windshield. The device utilizes a simple stud-slot sliding mechanism to adjust horizontally in relation to the windshield wiper post, and vertically in relation to the replacement windshield. This slidable adjustability allows for accurate marking of the removed windshield and one-man affixing of the replacement windshield.

In some embodiments, the windshield alignment and installation device comprises a bracket having a base plate and a slide plate. The base plate mounts to a slave post, and the slide plate abuts a face plate on a replacement windshield. Each plate forms at least one longitudinal slot useful for positional adjustments. The device may further include a wiper post panel comprising at least one stud and forming an aperture. The wiper post panel overlays the base plate, and is thereby mounted to the windshield wiper post. The aperture enables passage of the windshield wiper post for mounting. The studs align with, and slide through the at least one mount slot that forms in the base plate. This slidable relationship enables longitudinal adjustments to the wiper post panel relative to the windshield wiper post. The studs can be fastened along their respective mount slots to fasten the wiper post panel at a desired position relative to the windshield wiper post.

The device may further include a face plate comprising at least one stud and an overlaying pad. The face plate rests flush against the slide plate, engaging the replacement windshield to set the windshield in place. Similar to the wiper post panel, the studs align with, and slide through their respective windshield slots that form in the slide plate. This allows for longitudinal adjustments to the face plate.

The studs can be fastened along the windshield slots to place the face plate at a desired position relative to the replacement windshield. In this manner, the face plate overlaying their respective bracket plates slidably adjust in both a horizontal and vertical direction to accurately mark the position of the removed windshield; thereby setting the replacement windshield in the same position.

In one aspect, a portable windshield alignment and installation device, comprises a bracket being defined by a base plate and a slide plate. The base plate forms at least one longitudinal mount slot, the base plate being mountable to a slave post of a vehicle, the slide plate forming at least one longitudinal windshield slot, the slide plate abutting a windshield of the vehicle.

In some embodiments, the device includes a wiper post panel defined by an aperture that enables passage of the windshield wiper post for mounting the device to the slave post, the wiper post panel comprising at least one stud, the stud being in alignment with the longitudinal mount slot, the stud from the wiper post panel being slidably movable through the longitudinal mount slot of the base plate to enable longitudinal adjustments to the wiper post panel relative to the windshield wiper post.

In other embodiments, the device includes a face plate having at least one stud and a pad, the face plate being disposed to overlay the slide plate, the stud of the face plate being in alignment with the longitudinal windshield slot, the stud from the face plate being slidably movable through the longitudinal windshield slot of the slide plate, whereby the panels adjust horizontally and vertically.

In a motor home configuration of the windshield alignment and installation device, which is unique to other types of vehicles, a mount bracket is elongated and available in different lengths to accommodate the extended length of a motor home. The mount bracket of the motor home configuration has a base plate and a slide plate disposed in an orthogonal relationship. Each plate forms at least one longitudinal slot useful for positional adjustments. Further, two types of alignment brackets fit into their respective slot in the mount bracket to fasten to a motor home windshield wiper post.

In another aspect, the base plate and the slide plate are bent at 90° to each other.

In another aspect, the base plate and the slide plate are 1/8" thick; though other thicknesses are possible.

In another aspect, the aperture is about 1" diameter.

In another aspect, the stud of the wiper post panel is a 1/4" threaded bolt; though other types and sizes of bolts may be used in other embodiments.

In another aspect, the stud of the face plate is a 1/4" threaded bolt; though other types and sizes of bolts may be used in other embodiments.

In another aspect, the pad comprises a strip of nylon.

In another aspect, the device is operable with a motor home windshield.

In another aspect, the motor home fastening bracket is defined by a concave section wiper post plate that is sized to receive the slave post of the motor home.

In another aspect, the motor home fastening bracket comprises a bracket post extending from the concave section.

In another aspect, the bracket post is in alignment with at least one of the longitudinal mount slots, the bracket post being slidably movable through the longitudinal mount slots.

One objective of the present invention is to provide a device for marking a windshield in alignment with the windshield frame for setting a replacement windshield accurately.

Another objective is to provide a mount panel that mounts the device to a windshield wiper post.

Another objective is to provide slots that extend along the length of the plates of the bracket to enable the wiper post panel to slide horizontally relative to the windshield wiper post, and enable the face plate to slide vertically relative to the replacement windshield.

Another objective is to securely retain the replacement windshield with the face plate until the cure, or adhesive dries.

Another objective is to protect the replacement windshield from scratching with a pad that covers the face plate.

Another objective is to enable one installer to set the replacement windshield alone.

Another objective is to provide an inexpensive to manufacture windshield mounting device.

Another objective is to provide a device that helps in the alignment and installation of windshields for a motor home.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIGS. 14A-14B illustrate embodiments of an exemplary motor home wiper post panel, as shown in FIG. 13, where FIG. 14A shows a top view, and FIG. 14B shows a side view, in accordance with an embodiment of the present invention;

FIGS. 15A-15B illustrate embodiments of an exemplary motor home fastening bracket defined by a concave section, where FIG. 15A shows a top view, and FIG. 15B shows a side view, in accordance with an embodiment of the present invention;

FIGS. 16A-16B illustrate embodiments of an exemplary motor home bracket having a base plate and a slide plate, where FIG. 16A shows a top view, and FIG. 16B shows a side view, in accordance with an embodiment of the present invention;

FIGS. 17A-17B illustrate embodiments of an exemplary motor home fastening bracket with a post extending from the concave section, where FIG. 17A shows a top view, and FIG. 17B shows a side view, in accordance with an embodiment of the present invention;

FIGS. 18A-18B illustrate embodiments of an exemplary motor home face plate, where FIG. 18A shows a top view, FIG. 13B shows a bottom view, and FIG. 18C shows a side view, in accordance with an embodiment of the present invention.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
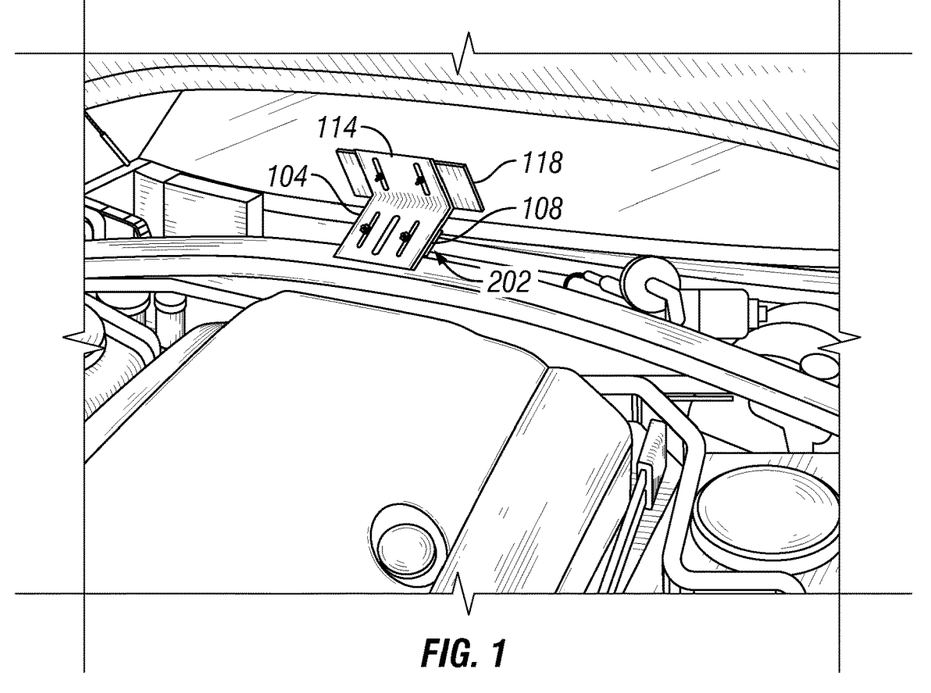
FIG. 1 illustrates a perspective view of an exemplary portable windshield alignment and installation device, showing the base plate of the bracket mounted to a windshield wiper post, in accordance with an embodiment of the present invention.

A portable windshield alignment and installation device 100 and method of installing windshields is referenced in FIGS. 1-19. The portable windshield alignment and installation device 100, hereafter "device 100" is a unique tool used for aligning a replacement windshield in preparation for installing in a vehicle windshield frame (FIG. 1). Replacing the broken or damaged windshield requires mounting a replacement windshield 200 to an associated vehicle frame through use of a mounting frame, bonding, and other fitting mechanism known in the art of windshields. This requires a precise alignment to achieve a secure fit to the vehicle frame.

Figure 2:
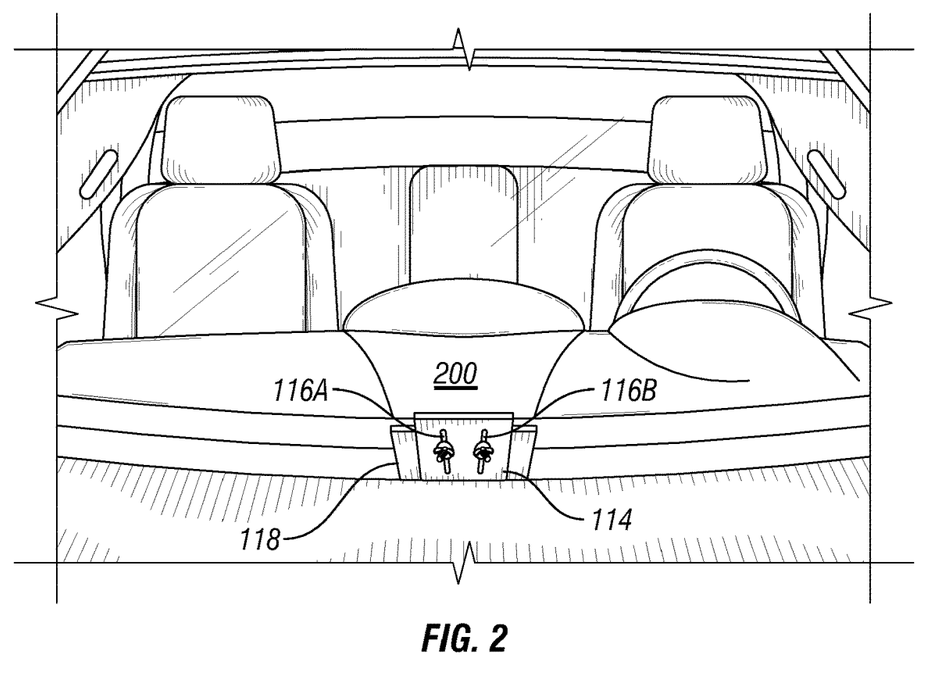
FIG. 2 illustrates a perspective view of the windshield installation device shown in FIG. 1, showing the slide plate of the bracket and overlaying face plate of the bracket abutting a replacement windshield, in accordance with an embodiment of the present invention.

Thus, as FIG. 2 illustrates, the device 100 is configured to mount to a windshield wiper post 202, which reside centrally or near-center at the bottom edge of the vehicle frame. The wiper post 202 can include a stud, a bolt, a frame, and other fastening means known in the art of vehicle windshields. The device 100 serves to mark the position of a removed windshield in alignment with the windshield frame, so that a replacement windshield 200 can be set in the exact same position inside the frame of the windshield.

In one embodiment, the device 100 is unique in utilizing a simple stud-slot sliding mechanism to adjust horizontally, in relation to the windshield wiper post; and vertically, in relation to the replacement windshield. This slidable adjustability allows for accurate marking of the removed windshield and one-man affixing of the replacement windshield. The device 100 utilizes face plates to minimize abrasion to the windshield, and is lightweight for portable windshield installation jobs.

Figure 3A:
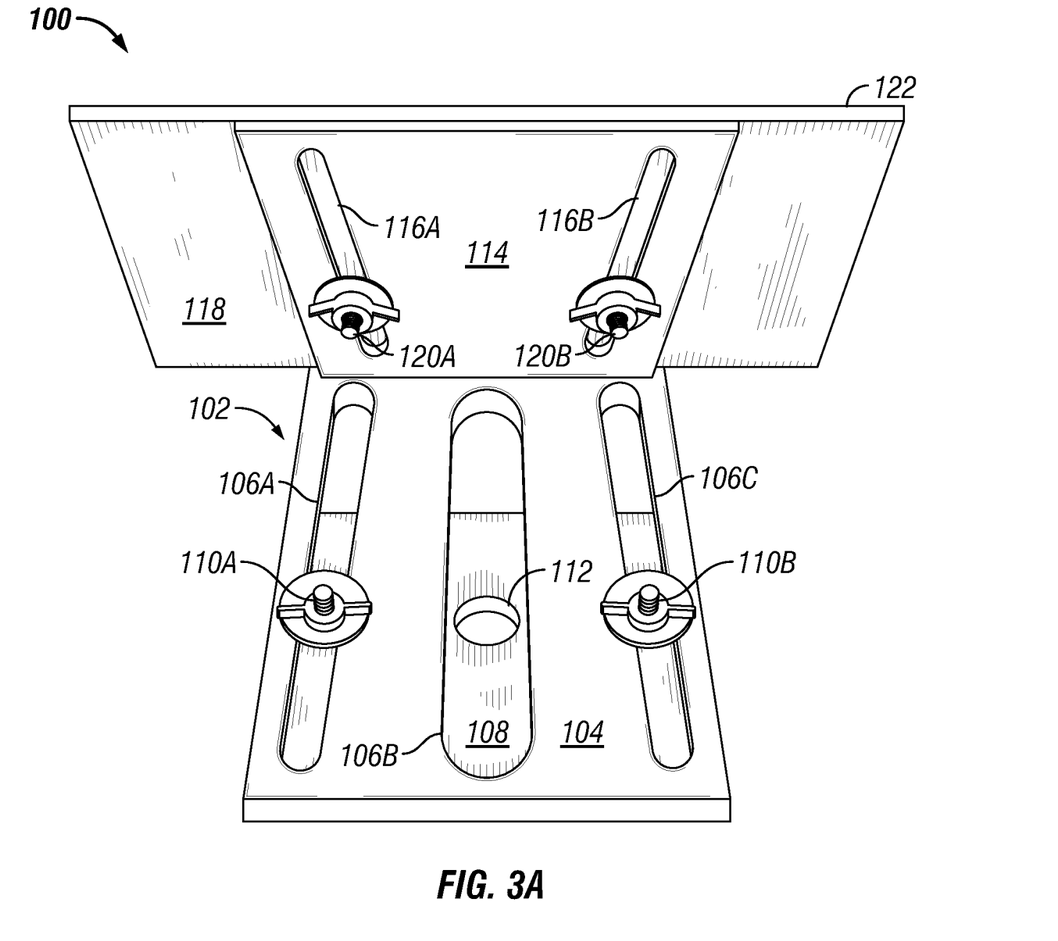
FIG. 3A illustrates a perspective view of the portable windshield alignment and installation device, shown in FIG. 1, in accordance with an embodiment of the present invention.
Figure 10:
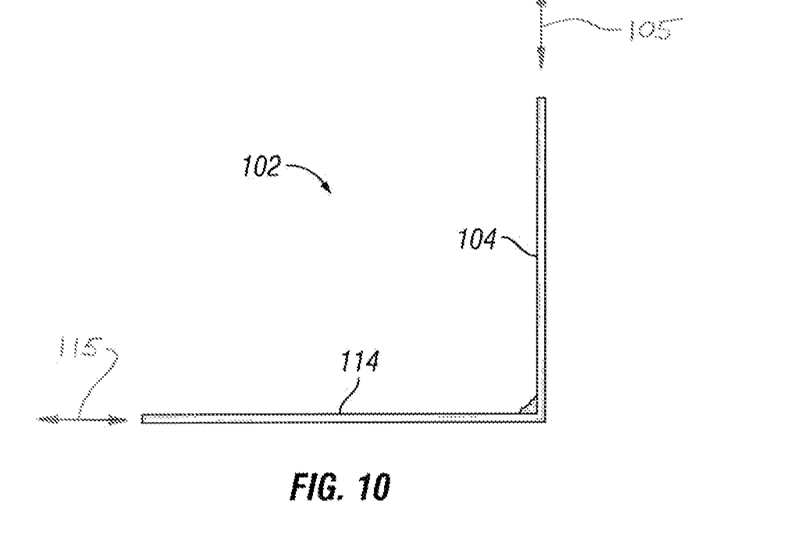
FIG. 10 illustrates an elevated side view of the bracket, in accordance with an embodiment of the present invention.

As shown in FIG. 3A, the device 100 mounts simultaneously to a vehicle frame and a windshield wiper post 202. The device may include a bracket 102 that mounts to the vehicle frame, and specifically the windshield wiper post 202 beneath the windshield wiper. The windshield wiper post 202 may be centrally, or off-center to the vehicle windshield frame. The bracket 102 comprises a base plate 104 and a slide plate 114 disposed in an orthogonal relationship. In one non-limiting embodiment, the base plate 104 and the slide plate 114 are two equally sized metal plates that are bent 90° to each other (FIG. 10). The plates 104, 114 may be welded together in a rigid construct. In other embodiments, the plates may be bolted together. As illustrated in FIG. 10, the base plate 104 may be disposed within a single first plane 105 and the slide plate 114 may be disposed within a single second plane 115. The first plane 105 and the second plane 115 of the respective base plate 104 and slide plate 114 may be disposed in an orthogonal relationship to each other.

Figure 4:
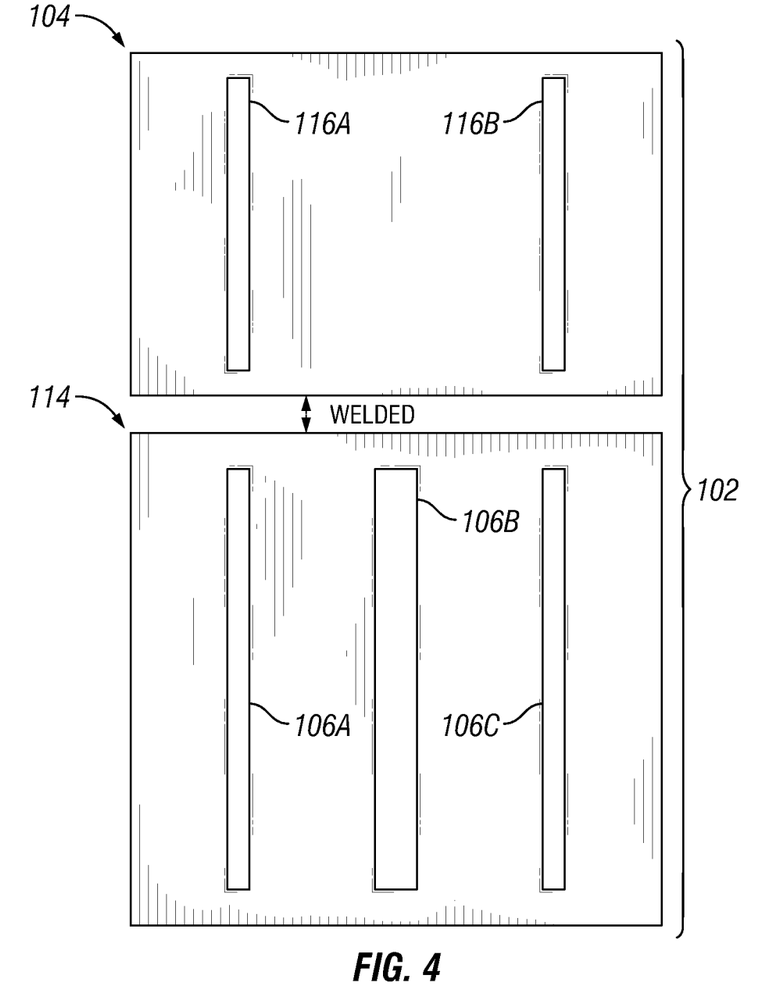
FIG. 4 illustrates a top view of the bracket for the windshield installation device, showing the base plate separated from the slide plate, in accordance with an embodiment of the present invention.

In another embodiment, the plates 104, 114 are ⅛" thick and have a rectangular shape; though other types and sizes of bolts may be used in other embodiments. The base plate 104 may be 4" in length, while the slide plate 114 may be 5" in length; though other lengths may be used in other embodiments. FIG. 4 illustrates a top view of the bracket 102, showing the base plate 104 separated from the slide plate 114, and ready for alignment and installation of replacement windshield 200.

Figure 5:
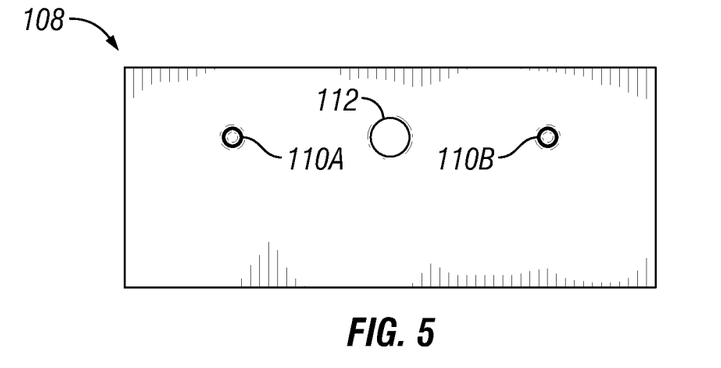
FIG. 5 illustrates a top view of the wiper post panel, in accordance with an embodiment of the present invention.

Turning now to FIG. 5, the base plate 104 of the bracket 102 is configured to mount to a windshield wiper post 202, and orients horizontally when mounted thereto. The base plate 104 forms at least one longitudinal mount slot 106*a-c*, which may include three parallel, spaced-apart slots. A central slot 106*b* enables passage of the windshield wiper post 202. The two outer slots 106*a*, 106*c* enable passage of studs from a wiper post panel 108.

Figure 12:
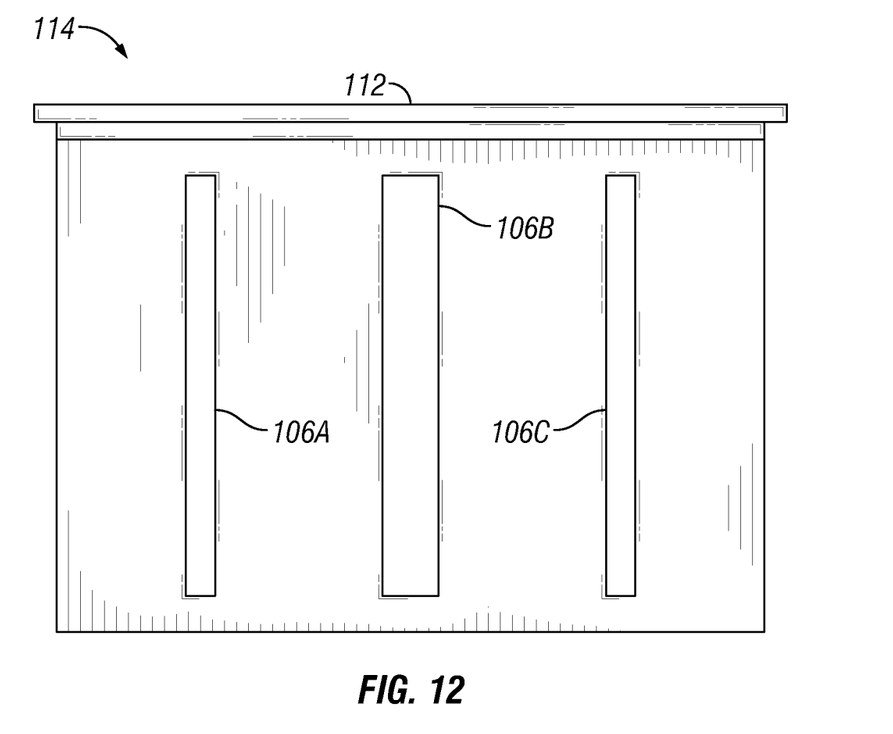
FIG. 12 illustrates a top view of the slide plate with dimensions, in accordance with an embodiment of the present invention.

The slide plate 114 of the bracket 102 is oriented vertically when mounted, such that the slide plate 114 is configured to abut a replacement windshield 200. The slide plate 114 forms at least one longitudinal windshield slot 116*a-b*, which may include two parallel, spaced-apart slots. Two outer slots enable passage of studs from a face plate 118. FIG. 12 illustrates a top view of the slide plate 114 with dimensions. For example, three versions of the slide plate 114 can be 2", 4½", or 10" long.

Figure 3B:
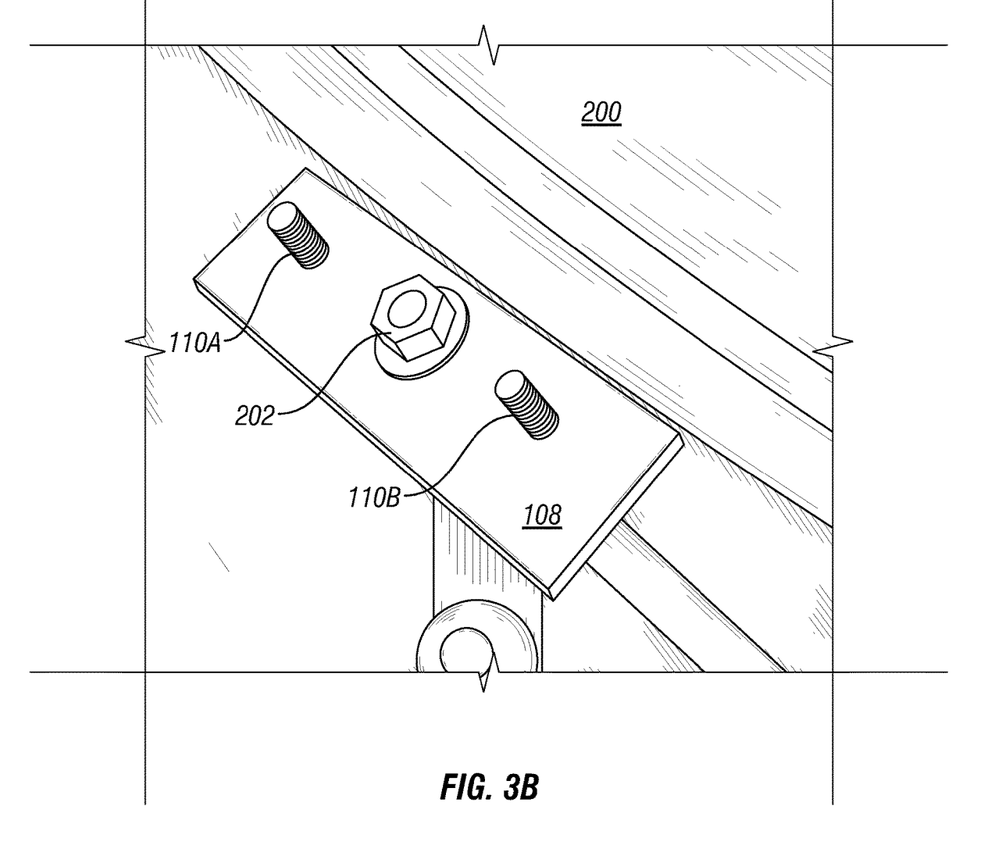
FIG. 3B illustrates a perspective view of an exemplary wiper post panel bolted to a slave post, in accordance with an embodiment of the present invention.
Figure 11:
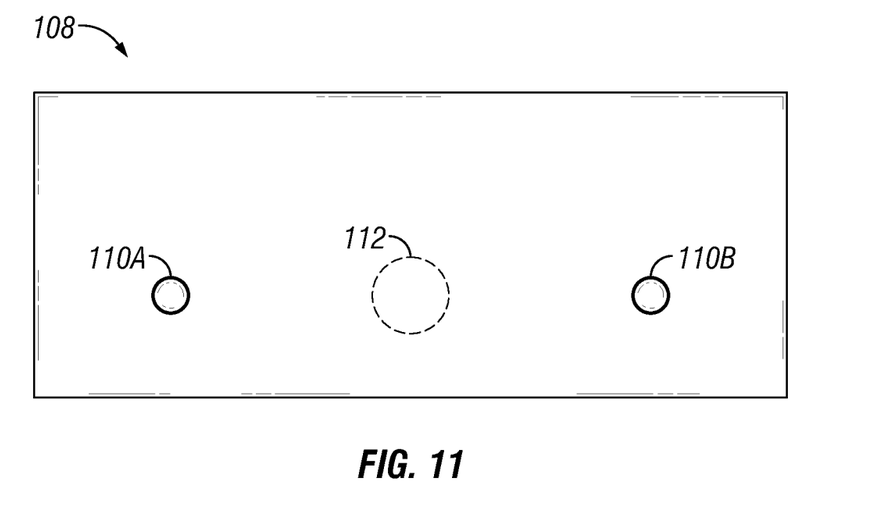
FIG. 11 illustrates a top view of the wiper post panel with dimensions, in accordance with an embodiment of the present invention.

As illustrated in FIG. 3B, the device 100 further comprises a wiper post panel 108 that overlays the base plate 104. FIG. 11 illustrates a top view of the wiper post panel with dimensions. For example, the wiper post panel 108 may be dimensioned to be flat, about 8" long, and about 4" wide. The wiper post panel 108 comprises at least one stud 110*a*, 110*b* and an aperture 112. The aperture 112 is centrally formed in the wiper post panel 108, and is sized and dimensioned to enable passage of a windshield wiper post 202 for mounting the device 100. The windshield wiper post 202 passes through the aperture 112 in a snug relationship.

Figure 6A:
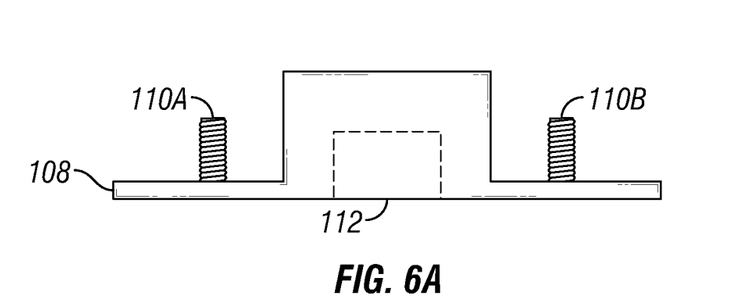
FIGS. 6A and 6B illustrate views of the wiper post panel, showing a side view and a top view, and having a small one-inch aperture to receive the windshield wiper post, in accordance with an embodiment of the present invention.
Figure 6B:
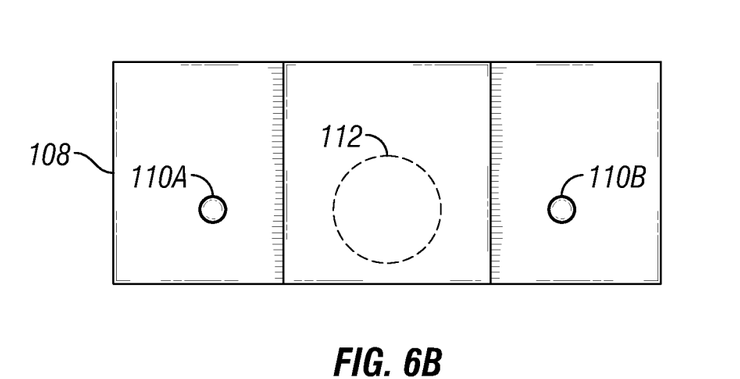
Figure 7A:
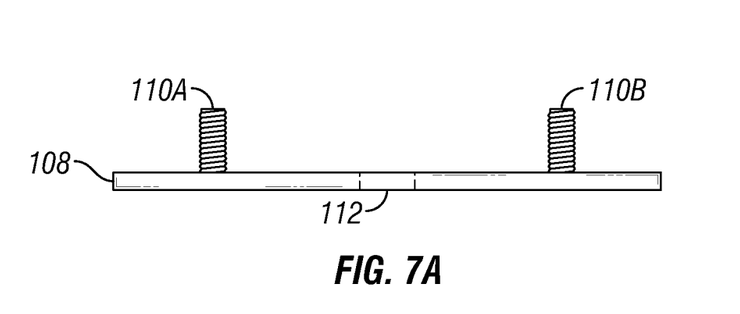
FIGS. 7A and 7B illustrate views of the wiper post panel, showing a side view and a top view, and having an aperture larger than 1" to receive the windshield wiper post, in accordance with an embodiment of the present invention.
Figure 7B:
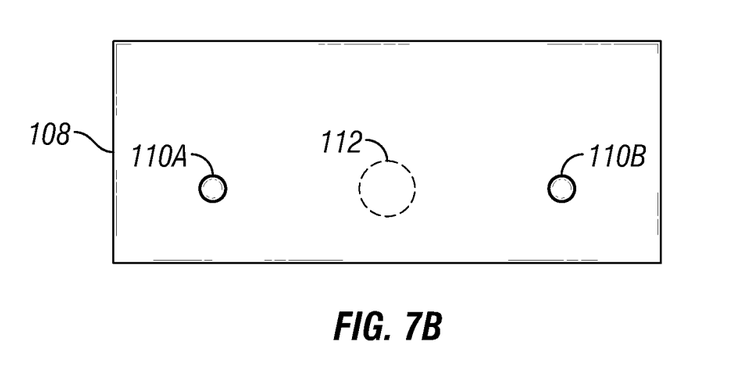

In one non-limiting embodiment, the aperture 112 is about 1" diameter (FIGS. 6A and 6B). Though the size of the aperture 112 is scalable to accommodate windshield wiper posts for different models of vehicles. For example, FIGS. 7A and 7B illustrates views of the wiper post panel 108 having an aperture larger than 1" to receive the windshield wiper post 202. FIG. 11 shows the wiper post panel 108 having an aperture of 1", ⅝", ½", ³⁄₁₆", or ⅜" in diameter.

The stud 110*a-b* from the wiper post panel 108 is in alignment with the at least one longitudinal mount slot 106*a-c* of the base plate 104. In this manner, the stud 110*a-b* from the wiper post panel 108 slides through the mount slot 106*a-c* that forms through the base plate 104. In one non-limiting embodiment, two studs 110*a-b* pass through two corresponding mount slot 106*a-cs*. The stud 110*a-b* may include a ¼" threaded bolt. The stud 110*a-b* can be fastened at a desired position along the longitudinal mount slot 106*a-c* with a nut, so as to enable longitudinal adjustments to the wiper post panel 108 relative to the windshield wiper post 202. This marks the position of the replaced windshield so that the replacement windshield 200 can be accurately installed.

Figure 8:
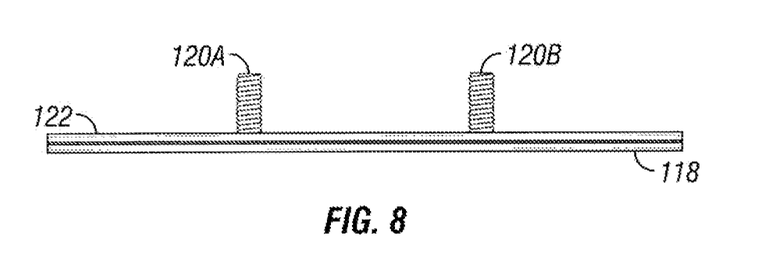
FIG. 8 illustrates an elevated side view of the face plate, in accordance with an embodiment of the present invention.

Turning now to FIG. 8, the device 100 further comprises a face plate 118 that abuts the replacement windshield 200, serving to retain the aligned windshield in place while the curing or adhesive around the perimeter of the replacement windshield 200 dries. The face plate 118 may be dimensioned to be flat, about 8" long, and about 4" wide.

Figure 9:
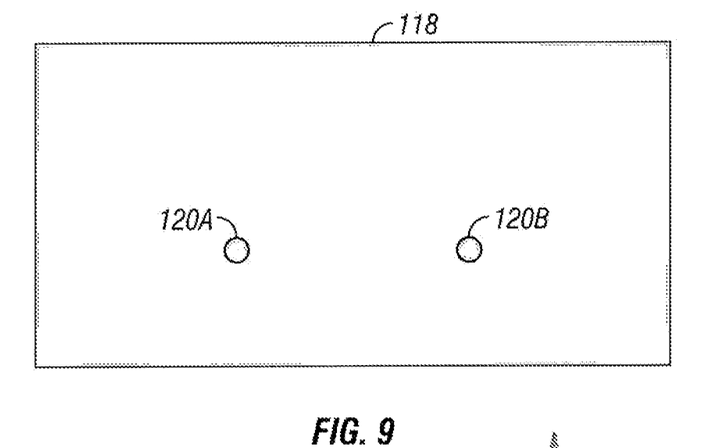
FIG. 9 illustrates a top view of the face plate, in accordance with an embodiment of the present invention.

As referenced in FIG. 9, the face plate 118 comprises at least one stud, and a pad 122 that lies flush against an external side of the face plate 118. The face plate 118 is disposed to overlay the slide plate 114. The pad 122 is disposed to abut the replacement windshield 200. In one non-limiting embodiment, the pad 122 comprises a strip of nylon. In some embodiments however, the pad comprises a strip of Teflon, wood, rubber, and all known plastics. Thus, the nylon, and generally soft configuration of the pad 122 helps prevent scratching or damage to the windshield from the metal panel or plate.

The at least one stud 120*a*, 120*b* is in alignment with the at least one longitudinal windshield slot 116*a-b*. The stud 120*a-b* from the face plate 118 slides through the longitudinal windshield slot 116*a-b* of the wiper post 202 plate. The stud 120*a-b* can be fastened at a desired position along the windshield slot 116*a-b*, so as to enable longitudinal adjustments to the face plate 118 relative to the replacement windshield 200. In one non-limiting embodiment, two studs 120*a-b* pass through two corresponding windshield slots 116*a-b*. The stud may include a ¼" threaded bolt.

Consequently, the panels 108, 118 overlaying their corresponding plates 104, 114 adjust horizontally and vertically to accurately mark the position of a removed windshield. This allows a replacement windshield 200 can be set in the exact same position. In any case, the device 100 is centrally disposed relative to the replacement windshield 200 because the windshield wiper post 202 is usually central to the windshield wiper. Also, the horizontal and vertical adjustments to the panels 108, 118 allows for calibrating the position of replacement windshield 200 for variously sized and styled vehicle windshields.

Those skilled in the art will recognize that a standard motor home is a self-propelled recreational vehicle, often used for vacations. Motor homes are known to be high off the ground, and thereby susceptible to having their windshield struck by external objects, such as tree limbs, or natural weather phenomena's. Consequently, it is often necessary to change/replace the windshield of the motor home. Unlike the windshield installation device discussed above, the motor home has a wider and longer windshield. Also, the motor home has a longer windshield wiper post. This requires a modification to the portable windshield alignment and installation device 100 discussed above.

Figure 13:
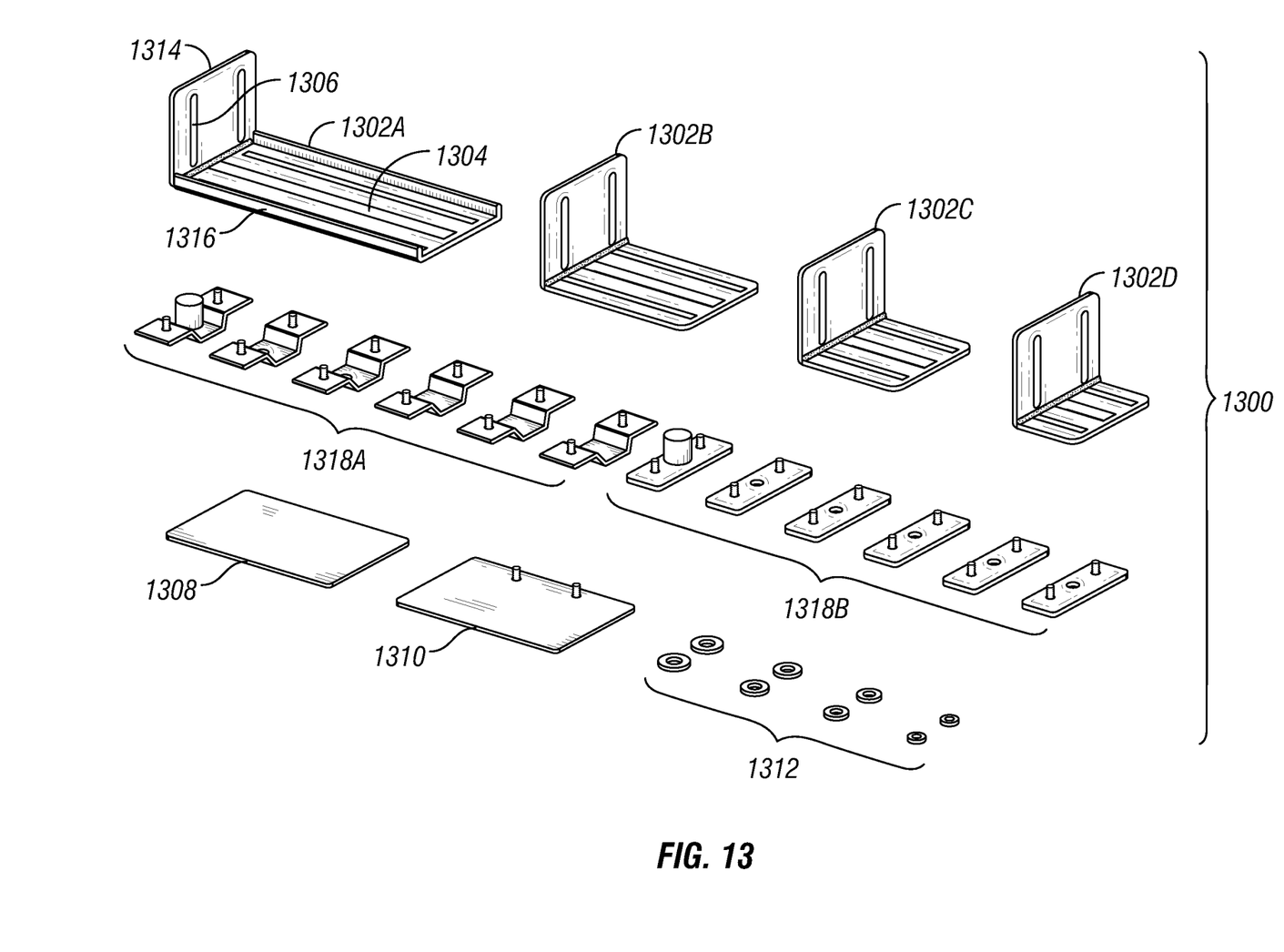
FIG. 13 illustrates an exemplary assembly of a motor home-compatible windshield alignment and installation device, showing an elongated motor home bracket, a motor home wiper post panel, a motor home face plate, and various versions of a motor home fastening bracket, in accordance with an embodiment of the present invention.

For example, FIG. 13 illustrates an exemplary assembly 1300 of a motor home-compatible windshield alignment and installation device, showing various dimensions of an elongated motor home bracket 1302*a*, 1302*b*, 1302*c*, 1302*d*; a motor home wiper post panel 1308, a motor home face plate 1310, and various versions of a motor home fastening bracket 1318*a*, 1318*b*. These components operate in substantially the same manner as the device 100 discussed above, except that their dimensions are adapted for a motor home.

The elongated motor home bracket 1302*a* has a base plate 1314 and a slide plate 1316 arranged in an orthogonal relationship. The plates 1314, 1316 are joined in an orthogonal relationship that allows the slide plate to engage the motor home windshield in a substantially flush relationship. Also, the base plate 1314 of the elongated motor home bracket is designed to directly receive the slave post of a motor home, which can be longer, and positioned differently than a standard vehicle slave post. The base plate forms a plurality of longitudinal mount slots 1306. The slide plate is defined by a plurality of longitudinal windshield slots 1304. Various fastening washers 1312, such as Looking ahead to FIG. 16A, one embodiment of a motor home bracket 1600 includes two flat plates—a base plate 1608 and a slide plate 1602. The base plate 1608 forms a plurality of longitudinal mount slots that help align the motor home bracket 1600 vertically against the motor home windshield. The slide plate 1602 is defined by a plurality of longitudinal windshield slots 1604, 1606*a*, 1606*b* that receive corresponding studs/screws/bolts to fasten at a desired vertical position. This serves as a mark for the replacement motor home windshield. The orthogonal relationship, shown in FIG. 16B allows for a snug fit at the lower edge of the motor home windshield.

Figure 14A:
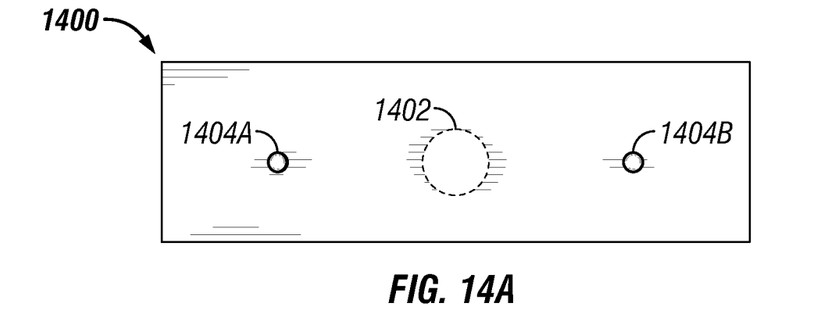
Figure 14B:
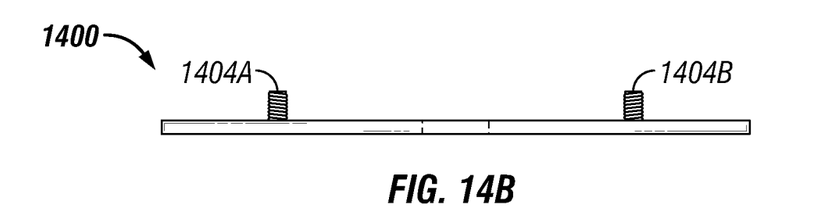

Turning now to FIG. 14A, a motor home wiper post panel 1400 overlays the base plate 1314. The motor home wiper post panel 1400 is defined by at least one aperture 1404a, 1404b. The aperture 1404a-b receives the windshield mount post in a slidable relationship that allows for adjustability along the vertical. In one possible embodiment shown in FIG. 14B, the motor home wiper post panel 1400 comprises at least one stud 1402. The stud 1402 is in alignment with at least one of the longitudinal mount slots 1306. In operation, the stud 1402 from the motor home wiper post panel 1400 is slidably movable through the longitudinal mount slots of the base plate 1608.

Figure 18A:
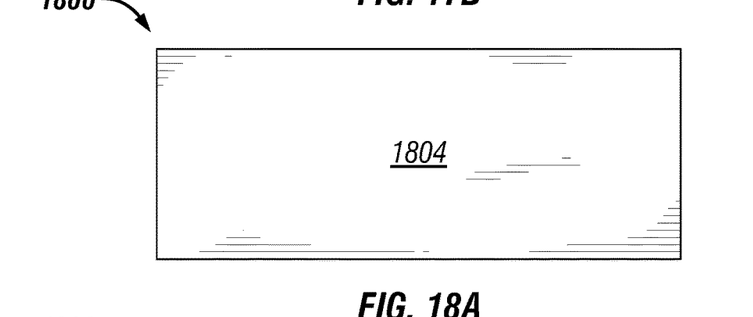
Figure 18B:
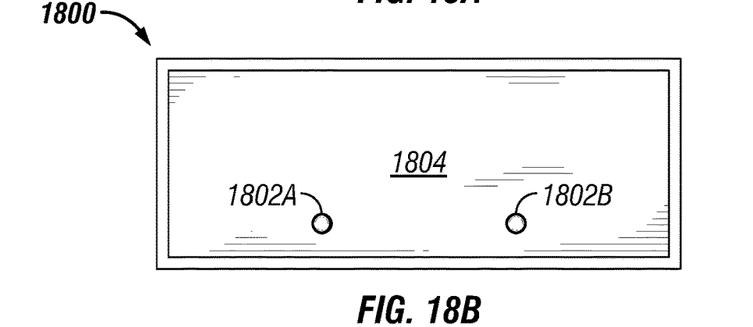
Figure 18C:
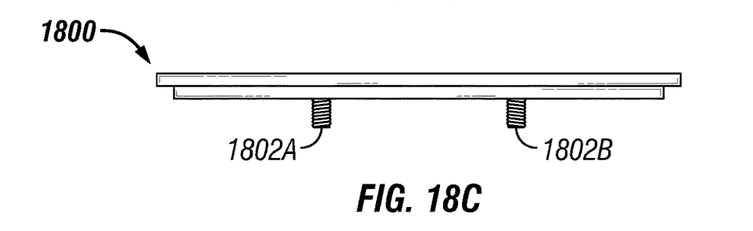

Looking now ahead to FIG. 18A, the assembly 1300 also includes a motor home face plate 1800. The face plate 1800 is configured to abut the motor home replacement windshield, serving to retain the aligned motor home windshield in place while the curing or adhesive around the perimeter of the replacement motor home windshield dries. The motor home face plate 1800 is generally flat, and greater than 12" long, and 6" wide. A bottom view is shown in FIG. 18A, and a top view of the motor home face plate 1800 is shown in FIG. 18B.

In some embodiments, the motor home face plate 1800 has at least one stud 1802a, 1802b and a pad 1804. The motor home face plate 1800 is disposed to overlay the slide plate by engaging the pad 1804 thereon. The stud 1802a-b of the motor home face plate 1800 may include two spaced-apart studs 1802a, 1802b that are in alignment with at least one of the longitudinal windshield slots. Further, the stud 1802a-b from the motor home face plate 1800 is slidably movable through the longitudinal windshield slot of the slide plate. This slidable relationship allows the whereby the motor home face plate 1800 to adjust horizontally and/or vertically along the motor home windshield.

Figure 15A:
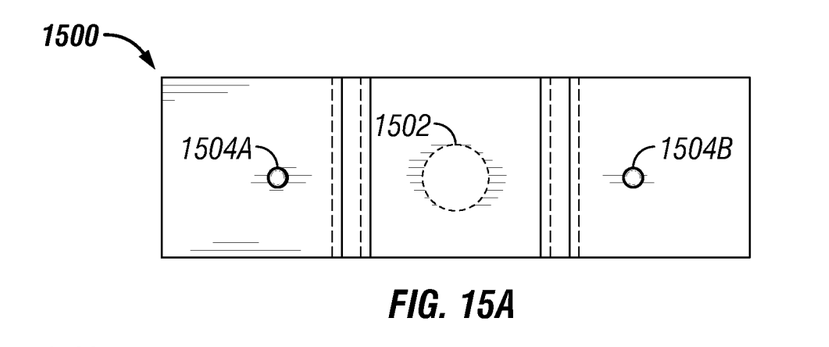
Figure 15B:
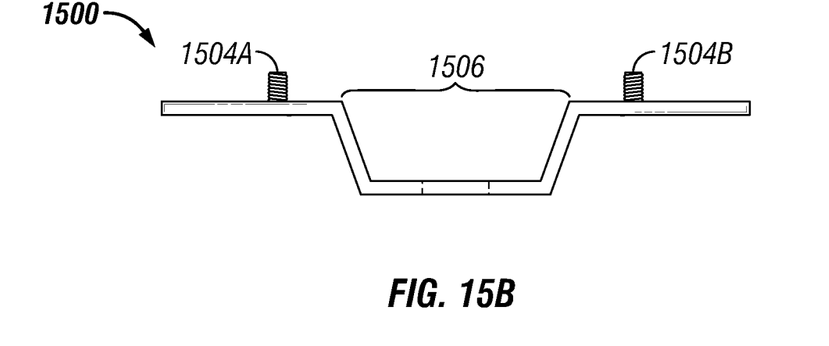
Figure 16A:
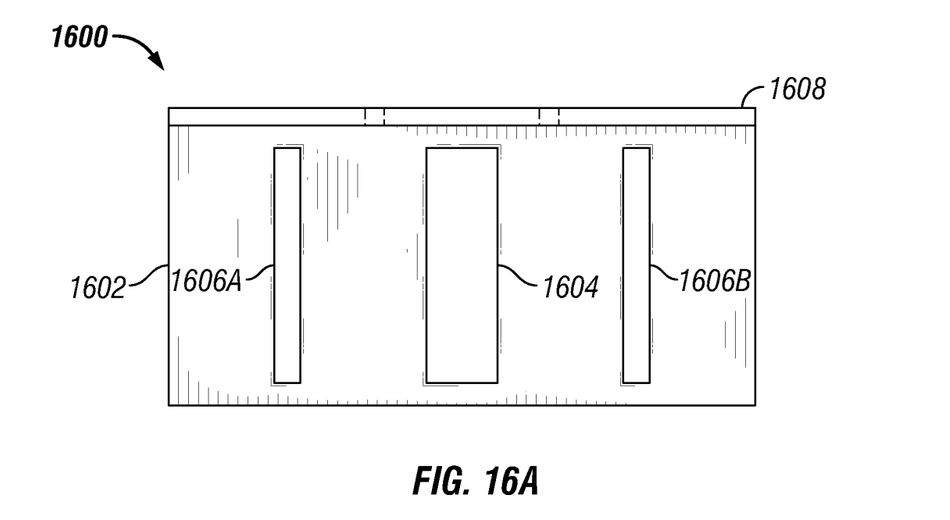
Figure 16B:
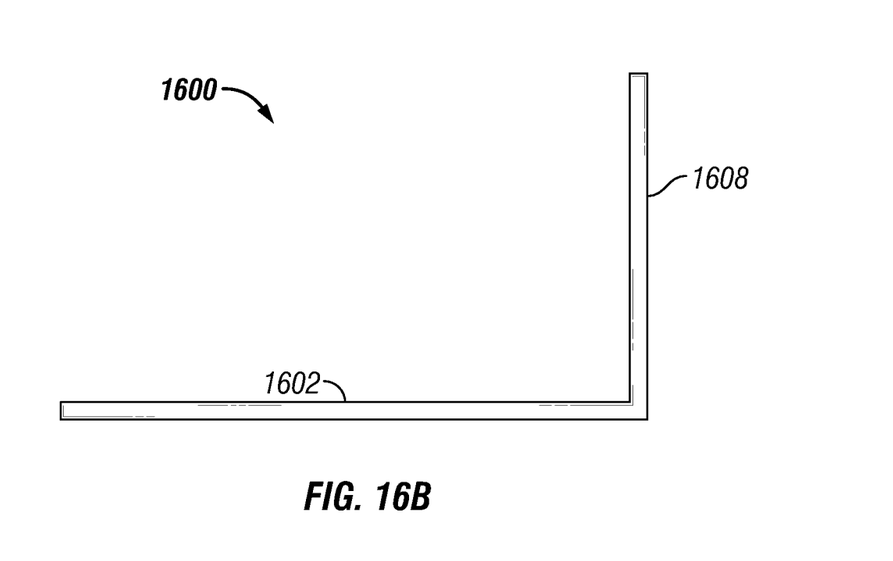

Turning now to FIGS. 15A and 15B, the assembly 1300 provides a motor home fastening bracket 1500 defined by at least one bracket aperture 1502 that is sized and dimensioned to receive the stud 1802a from the motor home face plate 1800. The motor home fastening bracket 1500 also includes at least one stud 1504a, 1504b fastenable at a fixed position along the longitudinal windshield slots. In one non-limiting embodiment, the motor home fastening bracket 1500 is defined by a concave section 1506 sized to receive the slave post of the motor home windshield. In this manner, the base plate mounts to a slave post of the motor home.

Figure 17A:
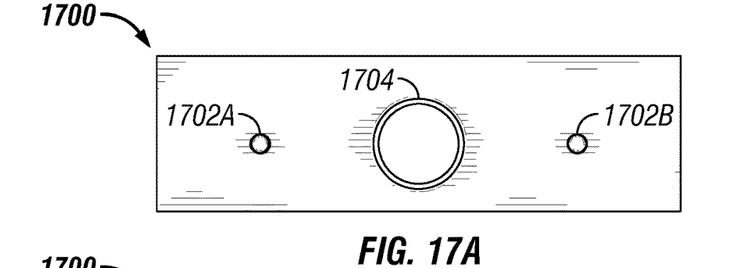
Figure 17B:
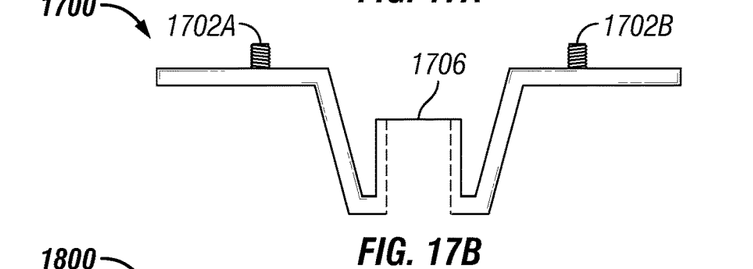

As FIGS. 17A-17B show, another embodiment of a motor home fastening bracket 1700 comprises a bracket post 1704 extending from a concave section wiper post plate 1706 that is indented to allow for the slave post to bolt to the base plate. This The bracket post 1704 is in alignment with at least one of the longitudinal mount slots. The bracket post 1704 is operable to be slidably movable through the longitudinal mount slots, so as to adjust the motor home bracket along the motor home windshield accordingly. Additionally, the motor home fastening bracket 1700 provides a pair of studs 1702a, 1702b that are fastenable at a fixed position along the longitudinal motor home windshield slots.

Figure 19:
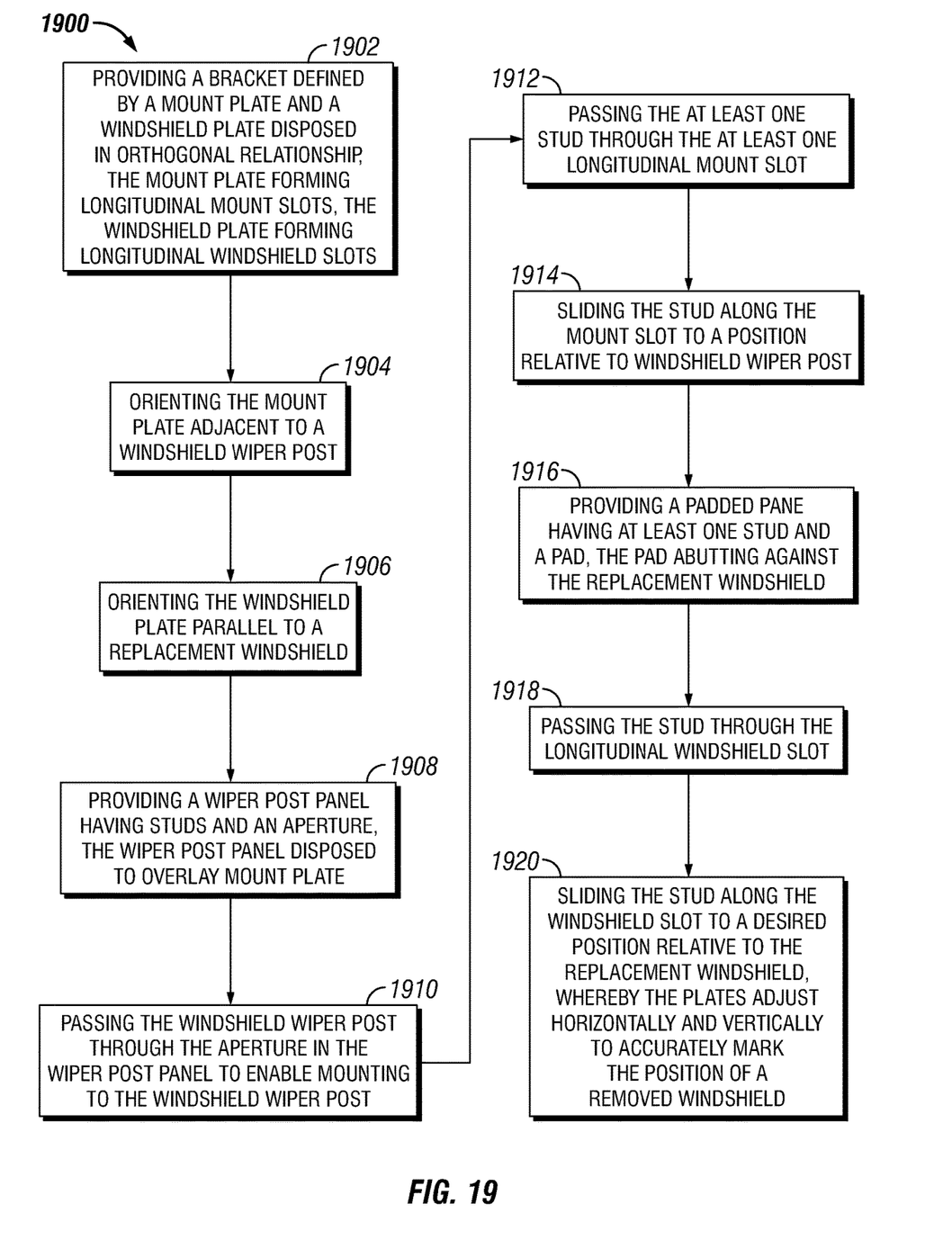
FIG. 19 references an exemplary method for setting windshields, in accordance with an embodiment of the present invention.

FIG. 19 references an exemplary method 300 for setting windshields. The method may include an initial Step 1902 of providing a bracket defined by a base plate and a slide plate disposed in an orthogonal relationship, the base plate forming at least one longitudinal mount slot, the slide plate forming at least one longitudinal windshield slot.

The method 1900 may further comprise a Step 1904 of orienting the base plate adjacent to a windshield wiper post. A Step 1906 includes orienting the slide plate parallel to a replacement windshield. In some embodiments, a Step 1908 comprises providing a wiper post panel having at least one stud and an aperture, the wiper post panel disposed to overlay the base plate. A Step 1910 includes passing the windshield wiper post through the aperture in the wiper post panel to enable mounting to the windshield wiper post.

In some embodiments, a Step 1912 may include passing the at least one stud through the at least one longitudinal mount slot. A Step 1914 comprises sliding the stud along the mount slot to a desired position relative to the windshield wiper post. A Step 1916 may include providing a face plate having at least one stud and a pad, the pad abutting against the replacement windshield. The method 1900 also includes a Step 1918 of passing the stud through the at least one longitudinal windshield slot. A final Step 1920 includes sliding the stud along the windshield slot to a desired position relative to the replacement windshield, whereby the plates adjust horizontally and vertically to accurately mark the position of a removed windshield, such that the new windshield can be set in the exact same position These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A portable windshield alignment and installation device, the device comprising:
    a bracket being defined by a base plate disposed within a single first plane and a slide plate disposed within a single second plane, the first plane and the second plane of the plates being disposed in an orthogonal relationship and abut each other, the base plate forming at least one longitudinal mount slot disposed within the first plane, the slide plate forming at least one longitudinal windshield slot disposed within the second plane (115);
    a wiper post panel disposed to rest adjacent and parallel to the base plate, the wiper post panel being defined by at least one aperture and at least one stud, the stud being slidably movable through the longitudinal mount slot of the base plate; and
    a face plate having at least one face stud and a pad, the face plate being disposed to rest adjacent and parallel to the slide plate, the face stud of the face plate being slidably movable through the longitudinal windshield slot of the slide plate,
    whereby the bracket adjusts longitudinally across the wiper post panel and the face plate.

2. The device of claim 1, wherein the base plate mounts to a slave post of a vehicle.

3. The device of claim 2, wherein the slide plate abuts a windshield of the vehicle.

4. The device of claim 3, wherein the aperture enables passage of a windshield wiper post for mounting the device to the slave post.

5. The device of claim 4, wherein the stud is slidably movable through the longitudinal mount slot of the base plate to enable longitudinal adjustments to the bracket relative to the windshield wiper post.

6. The device of claim 5, wherein the pad abuts the windshield.

7. The device of claim 6, wherein the face stud is slidably movable through the longitudinal windshield slot of the slide plate to enable longitudinal adjustments to the face plate relative to the windshield.

8. The device of claim 7, wherein the wiper post panel and the face plate adjust vertically to accurately mark the position of a windshield being removed from the vehicle, such that a replacement windshield can be set in the same position as the windshield being removed.

9. The device of claim 1, wherein the base plate and the slide plate are bent at 90 degrees to each other.

10. The device of claim 1, wherein the slide plate has a thickness including at least one of the following: ⅛ inch, 1/16 inch, and 1/32 inch.

11. The device (100) of claim 1, wherein the aperture has a diameter including at least one of the following: 1 inch, ⅝ inch, ½ inch, 3/16 inch, and ⅜ inch.

12. The device of claim 1, wherein the stud of the wiper post panel comprises a threaded bolt between ⅜ inches to 1 inch in length.

13. The device of claim 1, wherein the face stud of the face plate comprises a ¼ inch threaded bolt.

14. The device of claim 1, wherein the pad comprises a strip fabricated from at least one of the following materials: nylon, Teflon, wood, rubber, and a plastic.

* * * * *